July 23, 1957   R. BINDER   2,800,208
AUTOMATIC CLUTCH CONTROL SYSTEM
Filed Nov. 2, 1954   2 Sheets-Sheet 1
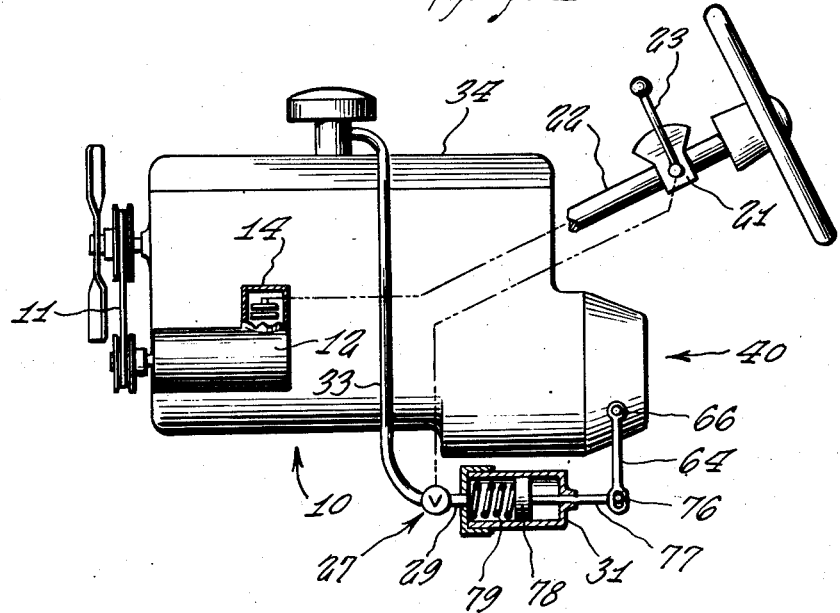
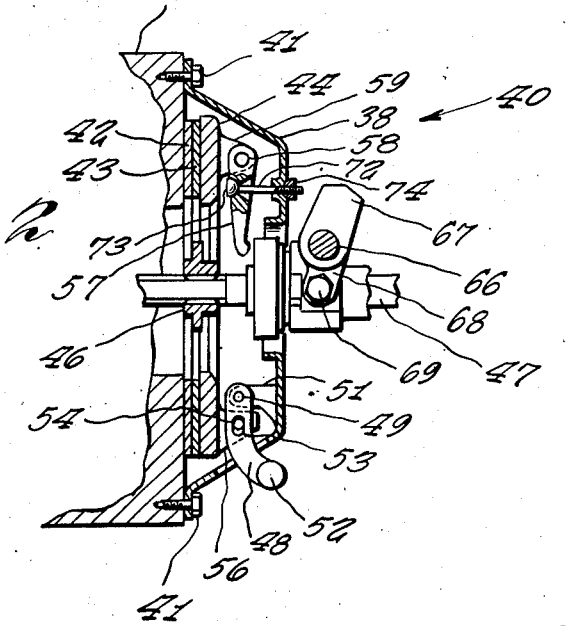
INVENTOR.
RICHARD BINDER July 23, 1957 R. BINDER 2,800,208
AUTOMATIC CLUTCH CONTROL SYSTEM
Filed Nov. 2, 1954 2 Sheets-Sheet 2
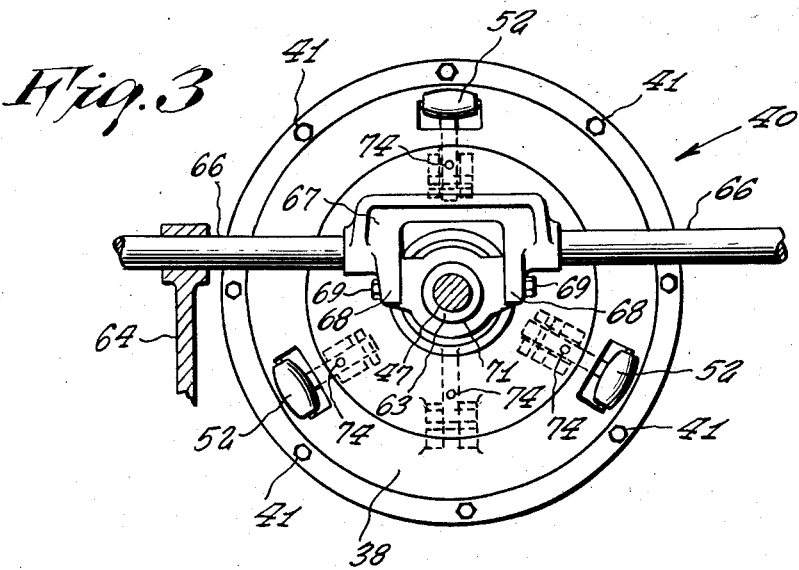
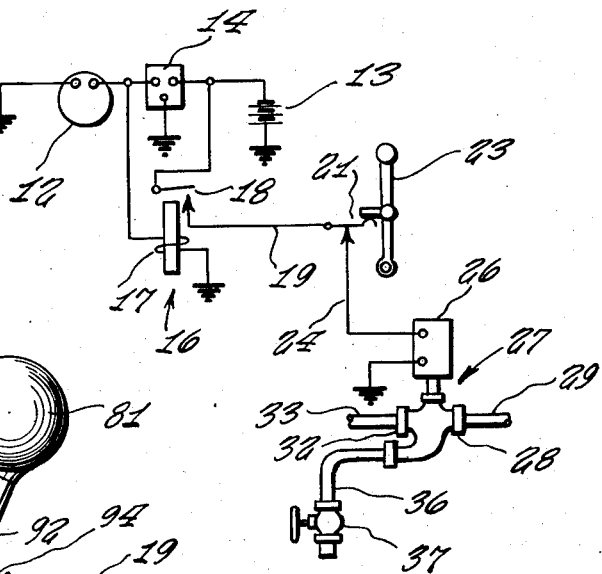
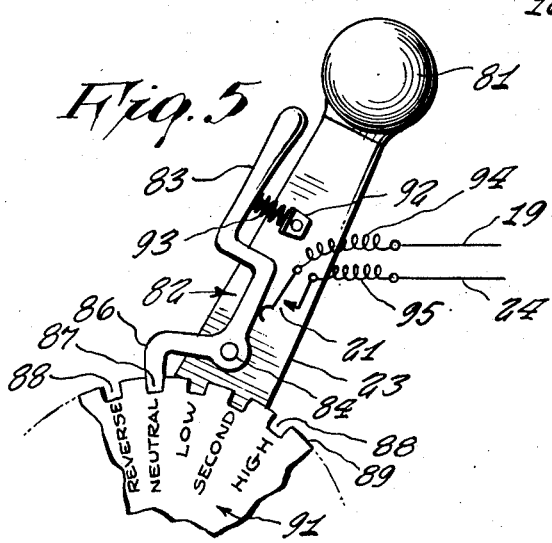
INVENTOR.
RICHARD BINDER
BY
his ATTORNEYS

United States Patent Office 2,800,208
Patented July 23, 1957

2,800,208
AUTOMATIC CLUTCH CONTROL SYSTEM

Richard Binder, Schweinfurt (Main), Germany, assignor to Fichtel & Sachs A. G., Schweinfurt (Main), Germany Application November 2, 1954, Serial No. 466,410

Claims priority application Germany November 10, 1953

6 Claims. (Cl. 192—3.5)

The present invention relates to automatic clutch control systems, and more particularly to automatic clutch control systems of this character which are suitable for use in automotive vehicles for disengaging the engine from the driven wheels while shifting gears.

Generally, the invention comprises a centrifugal clutch which is disengaged while the engine is idling and which becomes engaged when the engine is accelerated to normal driving speed, the centrifugal clutch being provided with a control lever which may be actuated to disengage the clutch while the engine is running in the normal range of driving speeds when the clutch would otherwise be centrifugally engaged. The usual gear shift lever is connected to control means which will cause a power operated device to disengage the clutch whenever the gear shift lever is moved to its neutral position or otherwise moved to shift gears while the engine is running in the usual range of driving speeds. A delay or retarding device is provided which causes the clutch to engage gradually and smoothly after the new gear ratio in the transmission has been selected.

Accordingly, it is an object of the invention to provide an automatic power operated clutch control system in which the gear shift lever will cause the clutch to become disengaged whenever the gear shift lever is moved to shift gears with the engine operating at a speed within normal range of driving speeds.

A further object of the invention is to provide a clutch control system of this character in which the clutch will reengage smoothly after a new gear ratio has been selected.

Another object of the invention is the provision of means for causing the control system to be inoperative when the engine is idling or shut off and use of the clutch control system is not required.

Other and further objects will become apparent upon reading the following specification together with the accompanying drawing forming a part hereof.

Referring to the drawing:

Figure 1 is a diagrammatic elevational view of a clutch control system embodying the invention.

Figure 2 is a diagrammatic view in sectional elevation of a centrifugal clutch suitable for use in the control system of the present invention.

Figure 3 is a diagrammatic end view of the centrifugal clutch shown in Fig. 2.

Figure 4 is an electrical circuit diagram of the control system shown in Fig. 1.

Figure 5 is a fragmentary diagrammatic view of a modified form of gear shift control lever.

Referring to Fig. 1, an internal combustion engine designated generally as 10 is shown provided with a fan belt 11 which drives a battery charging generator 12 in the usual manner. The generator 12 is connected to a battery 13 (Fig. 4) through a conventional cut-out and voltage regulator 14. A voltage relay designated generally as 16 is shown provided with an operating winding 17 connected across the generator output. The contacts 18 of relay 16, when closed, connect a conductor 19 to the battery 13. The conductor 19 extends to a switch 21 mounted on the steering column 22 along with the gear shift lever 23. Gear shift lever 23 is selectively movable to a neutral position and one or more driving positions, in the usual manner, it being necessary to move through the neutral position to change gear ratios.

The contacts of switch 21 are shown closed, the gear shift lever 23 being shown in its neutral position. Whenever gear shift lever 23 is moved from its neutral position to select a driving gear ratio in the transmission (not shown) the contacts of switch 21 will open. The switch 21 is connected by a further conductor 24 to the actuating solenoid 26 of an electromagnetically controlled air valve designated generally as 27. If the gear shift lever 23 includes a locking lever which must be grasped to unlock the gear shift lever before the gear shift lever can be moved, then the contacts of switch 21 may advantageously be controlled by the locking lever.

The valve 27 is provided with a connection 28 which extends through as suction line 29 to a clutch actuating vacuum cylinder 31. Valve 27 is also provided with another connection 32 which extends through a further suction line 33 to the intake manifold 34 of the engine 10. A third connection of the valve 27 communicates with the atmosphere through a suction line 36 and an adjustable throttling valve 37.

When solenoid 26 is energized, valve 27 connects the vacuum cylinder 31 to the intake manifold 34. When solenoid 26 is deenergized, valve 27 connects the vacuum cylinder 31 to the atmosphere through the throttling valve 37.

The clutch 40 is shown in greater detail in Figs. 2 and 3 and comprises a supporting plate 38 secured to a flywheel 39 by a circle of bolts 41. The flywheel 39 is driven by the engine 10 in the usual manner. A driven friction member 42 engageable with flywheel 39 cooperates with a driving friction member 43 for engagement and disengagement of the clutch 40, the driven friction member 42 being sandwiched between the driving friction member 43 and the flywheel 39.

The driving friction member 43 is fixed to an annular driving pressure plate 44. Driven friction member 42 is connected to a collar 46 for rotation therewith and the collar 46 is splined to a driven shaft 47. Three radially extending clutch engaging levers 48 are shown pivotally connected by coplanar pivots 49 to lugs 51 which project inwardly from supporting plate 38. At its free end each of the clutch engaging levers 48 carries a weight 52, each weight 52 being axially displaced from a plane normal to the axis of driven shaft 47 and passing through the pivots 49. Intermediate its ends, each clutch engaging lever has an elogated slot 53 formed therein which slidably engages a pin 54 carried by a lug 56 fixed to the annular pressure plate 44.

As the speed of rotation of flywheel 39 increases, the accompanying centrifugal force urges the respective centers of gravity of the weights 52 toward the plane of the pivots 49 with a resultant leftward pressure on the pins 54 which presses the driving friction member 43 into driving engagement with the driven friction member 42, whereby the driven shaft 47 is coupled to the flywheel 39 to be driven by the engine 10.

The centrifugal clutch 40 further comprises three clutch disengaging levers 57 each pivoted at 58 to a lug 59 fixed to the annular driving member 44. The inner free ends 61 of the disengaging levers 57 are simultaneously engageable by a clutch disengaging collar member 62 mounted on a sleeve 63 which is freely slidable along driven shaft 47. A master clutch disengaging lever 64 is fixed to a transverse shaft 66 which is suitably journaled in fixed bearings (not shown), the shaft 66 being divided into two parts rigidly interconnected by a yoke 67 which extends over the driven shaft 47. The yoke 67 comprises spaced ears 68 which are pivotally connected by bolts 69 to an axially movable member 71. The axially movable member 71 is connected to collar member 62 for movement therewith to engage or disengage the clutch 40 at will when the clutch would otherwise be continuously engaged by the centrifugal action of weights 52.

Each of the clutch disengaging levers 57 is pivotally connected intermediate its ends to the clutch supporting plate 38 by a tie bolt 72. Each tie bolt 72 is provided with an inner head 73 which bears against the inner side of one of the clutch disengaging levers 57 and an outer head 74 which bears against the outer portion of clutch supporting plate 38, the heads 73 and 74 of each tie bolt 72 being disposed in appropriate recesses to permit limited pivotal movement of the tie bolt heads 73 and 74.

As shown in Fig. 1, the lower end of master clutch disengaging lever 64 is connected by a pivot pin 76 to the right hand end of a connecting rod 77. The left end of connecting rod 77 is connected to a piston 78 slidable in vacuum cylinder 31. The piston 78 is normally yieldingly urged toward the right by a helical compression spring 79 disposed within the cylinder 31. When air is withdrawn from cylinder 31 by suction applied to line 29, piston 78 moves toward the left. This produces clockwise rotation of master clutch lever 64 and the shaft 66 to which it is fixed. Clockwise rotation of shaft 66 (Fig. 2) causes corresponding rotation of ears 68 and forces axially slideable member 71 toward the left along with clutch disengaging collar member 62. Collar member 62 presses the free end portions 61 of disengaging levers 57 toward the left causing them to pivot on the inner bolt heads 73 and pull the annular driving member 44 toward the right by means of lugs 59 against the centrifugal action of weights 52 thereby reducing the pressure of driving engagement under which driven clutch friction member 42 is sandwiched between driving friction member 43 and the flywheel 39. Thus, the clutch 40 can always be completely disengaged by vacuum cylinder 31. Additionally, spring 79, upon urging piston 78 toward the right, will always restore full control of the clutch 40 to the engine speed responsive centrifugal weights 52.

Referring to Fig. 5, there is shown a modified form of gear shift lever 23 in which the lever 23 is not moved through a neutral position for each shifting of gears.

The gear shift lever 23 is shown provided with the usual knob 81 and a lock releasing lever 82 is shown provided with a manually engageable portion 83 disposed in convenient proximity to the knob 81. The releasing lever 82 is pivoted to the gear shift lever 23 at 84. The releasing lever 82 further comprises an extending arm portion 86 which terminates in a downwardly extending square ended locking tooth 87. The locking tooth 87 is selectively engageable in any one of a series of spaced rectangular notches 88 formed in the circular periphery 89 of a sector member 91. A bracket 92 is fixed to gear shift lever 23 and supports one end of a helical compression spring 93. The other end of spring 93 presses against the manually engageable portion 83 of releasing lever 82, yieldingly urging the locking tooth 87 into one of the notches 88.

Switch contacts 21 are mounted on gear shift lever 23 in proximity to releasing lever 82 and are connected by flexible conductors 94 and 95 to the conductors 19 and 24, respectively. Conductors 19 and 24 have been described above in connection with Fig. 4.

Whenever the manually engageable portion 83 of releasing lever 82 is pressed, tooth 87 is withdrawn upwardly from whichever notch 88 it may have been in and switch contacts 21 are simultaneously closed. Closure of contacts 21 causes clutch 40 to be disengaged as described above. The gear shift lever 23 is then free to be moved to select a new gear ratio. While tooth 87 rides on the circular periphery 89 of sector member 91 intermediate adjacent notches, tooth 87 is held raised and switch contacts 21 are held closed. When the desired new gear ratio has been selected and lever 82 is released to drop tooth 87 into the newly selected notch 88, contacts 21 open and clutch 40 smoothly reengages to render the newly selected gear ratio effective.

In operation, when the engine is shut off or operating at its relatively slow idling speed, relay contacts 18 are open and valve solenoid 26 is de-energized, thereby connecting vacuum cylinder 31 to the atmosphere through valve 27. Clutch actuating arm 64 remains in its normal position in which engagement of the driving and driven members 42 and 43 is permitted whenever the engine speed is sufficiently high. If the gear shift lever 23 is moved to select a low gear for starting, switch 21 opens and prevents energization of valve solenoid 26. As the engine speed is increased, centrifugal clutch friction members 42 and 43 gradually engage and the vehicle starts smoothly.

Gear shift lever 23 is then moved to neutral in order to select an intermediate gear ratio. This closes switch 21. In the meantime, as engine 10 came up to driving speed, the voltage of generator 12 increased and caused contacts 18 of relay 16 to close, the relay 16 being adjusted to close its contacts 18 at a generator voltage corresponding to an engine speed of the order of 600 R. P. M. which is preferably somewhat below the speed at which the clutch 40 becomes engaged. Shifting of the gear shift lever 23 to its neutral position therefore energizes valve solenoid 26 through relay contacts 18, conductor 19, switch 21, and conductor 24. Vacuum cylinder 31 is thereupon connected to the intake manifold 34 of engine 10 and the spring pressed piston 78 is drawn toward the left as viewed in Fig. 1, thereby rotating master clutch control lever 64 in a clockwise direction and disengaging the clutch members 42 and 43 notwithstanding the engaging action of the centrifugal weights 52.

Gear shift lever 23 is next moved from its neutral position to select another gear ratio, whereupon switch 21 opens, valve solenoid 26 is deenergized, and valve 27 connects vacuum cylinder 31 to the atmosphere through the adjustable throttling valve 37. Air enters the cylinder 31 at a rate controlled by valve 37 and compression spring 79 urges the piston 78 toward the right in a gradual and retarded manner, thereby smoothly reengaging the clutch 40.

Thus, whenever the gear shift lever 23 is moved through its neutral position to change gears, clutch 40 is disengaged and then smoothly reengaged after the desired gear ratio has been selected.

Although an electropneumatic control system has been shown by way of illustration any suitable equivalent control system could be used, the engine speed responsive relay contacts 18 being replaced wherever appropriate by an equivalent device and the gear shift switch 21 being similarly replaced if required, by other means actuated by the gear shift lever 23 whenever it is moved through its neutral position.

I have shown what I believe to be the best embodiments of my invention. However, it will be apparent to those skilled in the art that many changes and modifications may be made in the specific illustrative embodiments of the invention which are herein disclosed without departing from the scope of the invention as defined in the appended claims.

What is claimed is:

1. In combination with a centrifugal clutch including driving and driven members which become engaged only when said driving member is driven at a speed exceeding a first predetermined minimum speed, and clutch disengaging means for disengaging said driving and driven members irrespective of the speed of said driving member, the provision of: gear shifting means including a manually operable lever having a neutral position and at least two different gear ratio selecting positions for connecting a load to said clutch to be driven therethrough, a change in gear ratio being obtained by movement of said lever through said neutral position from one of said ratio selecting positions to another, power actuable means for operation of said clutch disengaging means, and control means actuated by said lever of said gear shifting means whenever said lever is in said neutral position, said control means being operatively connected to said power actuable means, whereby movement of said lever into said neutral position actuates said control means to thereby produce disengagement of said clutch through the medium of said power actuable means.

2. In an automatic clutch control system of the class described, in combination: a source of motive power including an internal combustion engine having an intake manifold; a driving clutch member connected to said source to be driven thereby; a driven clutch member co-operating with said driving clutch member to effect a disengageable coupling therebetween; clutch engaging means driven by said source along with said driving member and connected to cause driving engagement between said driving and driven members whenever the speed of said driving member exceeds a first predetermined minimum speed; power operated clutch disengaging means operatively connected to one of said driving and driven members to cause disengagement therebetween notwithstanding a speed of said driving member in excess of said first predetermined speed; said clutch disengaging means including a vacuum cylinder selectively communicable with the atmosphere and with said intake manifold, communication of said cylinder with said intake manifold serving to disengage said clutch members while communication of said cylinder with the atmosphere permitting engagement of said clutch members; gear shifting means movable to predetermined positions for effecting changes in the speed ratio between said source and a load to be driven by said source through said clutch members; and control means including a two position valve for selectively effecting communication between said vacum cylinder and said intake manifold or the atmosphere, said valve normally effecting communication between said cylinder and the atmosphere, an energizing circuit controlling said valve, an electrical switch serially included in said energizing circuit, said switch being actuable by said gear shifting means to close said energizing circuit in the course of said gear shifting movement to thereby disengage said clutch members, means responsive to the speed of said engine, and a pair of contacts controlled by said engine speed responsive means and serially included in said energizing circuit, said contacts being arranged to close and remain closed whenever the speed of said engine exceeds a second predetermined minimum speed higher than the idling speed of said engine, whereby said valve can be energized only when the engine speed is greater than said second speed and cannot be energized when the engine is idling or stopped.

3. In combination with an engine and a centrifugal clutch comprising driving and driven members which become engaged only when said driving member is driven by said engine at a speed which exceeds a first predetermined minimum speed, said clutch further comprising disengaging means for disengaging said driving and driven members irrespective of the speed of operation of said driving member and gear shifting means movable to select different gear ratios for connecting a load to said clutch to be driven therethrough, the provision of: power actuable means for operation of said disengaging means; first control means actuable by said gear shifting means in the course of gear ratio changing movement thereof, said first control means being connected to said power actuable means to cause disengagement of said clutch during said changing of said gear ratio, and second control means responsive to the speed of said engine and actuated when the speed of said engine exceeds a second predetermined minimum speed determined independently of the first predetermined minimum speed, said second control means being operatively connected to said first control means to render said first control means inoperative until the speed of said driving clutch member exceeds said second predetermined minimum speed.

4. The combination according to claim 3, wherein said second predetermined minimum speed is lower than said first predetermined minimum speed and higher than the idling speed of said engine, whereby said disengaging means will remain ineffectual until said engine rotates at a speed in excess of said second predetermined minimum speed.

5. The combination according to claim 3, wherein said engine includes an electrical system having a generator, the voltage of said generator depending upon the speed of said engine, said second control means being operatively connected with said generator through said electrical system, said second control means being actuated when the voltage of said generator exceeds a value corresponding to rotation of said engine at said second predetermined minimum speed.

6. In combination with a centrifugal clutch adapted to be driven by an engine and comprising: engageable driving and driven members, disengaging means for disengaging said driving and driven members when they would otherwise be engaged, and gear shifting means movable to a plurality of positions for selecting different gear ratios whereby a load may be connected to said engine to be driven therethrough, the provision of: power actuable means for causing clutch disengaging operation of said disengaging means; first control means actuated by said gear shifting means in the course of gear ratio changing movement thereof, said first control means being connected to said power actuable means to cause disengagement of said clutch during changing of said gear ratio; and second control means comprising speed responsive means driven with said engine and operative only when the speed of said engine exceeds a certain predetermined minimum speed, said second control means being connected to supersede the control of said clutch disengaging means by said first control means and to permit clutch disengaging operation of said disengaging means only when said engine speed exceeds said minimum speed.

References Cited in the file of this patent

UNITED STATES PATENTS

| 1,177,765 | Drachenberg | Apr. 4, 1916 |
| 1,806,158 | Giger | May 19, 1931 |
| 2,531,711 | Thomas | Nov. 28, 1950 |
| 2,634,839 | Price | Apr. 4, 1953 |